United States Patent
Liberatori, Jr.

(10) Patent No.: US 11,176,651 B2
(45) Date of Patent: Nov. 16, 2021

(54) COMPUTER-CONTROLLED 3D ANALYSIS OF COLLECTIBLE OBJECTS

(71) Applicant: Anthony C. Liberatori, Jr., Easton, PA (US)

(72) Inventor: Anthony C. Liberatori, Jr., Easton, PA (US)

(*) Notice: Subject to any disclaimer, the term of this patent is extended or adjusted under 35 U.S.C. 154(b) by 0 days.

(21) Appl. No.: 16/161,217

(22) Filed: Oct. 16, 2018

(65) Prior Publication Data

US 2019/0114762 A1 Apr. 18, 2019

Related U.S. Application Data

(60) Provisional application No. 62/573,877, filed on Oct. 18, 2017.

(51) Int. Cl.
| | |
|---|---|
| G06T 7/00 | (2017.01) |
| G06K 9/62 | (2006.01) |
| G06T 7/55 | (2017.01) |
| H04N 13/243 | (2018.01) |
| H04N 13/254 | (2018.01) |
| G07D 5/00 | (2006.01) |

(Continued)

(52) U.S. Cl.
CPC ............ *G06T 7/0002* (2013.01); *G06F 16/51* (2019.01); *G06F 16/5838* (2019.01); *G06K 9/6201* (2013.01); *G06T 7/55* (2017.01); *G07D 5/005* (2013.01); *H04N 13/243* (2018.05); *H04N 13/254* (2018.05); *G06T 2207/10012* (2013.01); *G06T 2207/10024* (2013.01); *G07D 2205/00* (2013.01)

(58) Field of Classification Search
CPC ... G06F 16/51; G06F 16/5838; G06K 9/6201; G06T 2207/10012; G06T 2207/10024; G06T 7/0002; G06T 7/55; G07D 2205/00; G07D 5/005; H04N 13/243; H04N 13/254

See application file for complete search history.

(56) References Cited

U.S. PATENT DOCUMENTS

| | | | | |
|---|---|---|---|---|
| 4,899,392 A | * | 2/1990 | Merton | G07D 5/00 |
| | | | | 194/302 |
| 5,220,614 A | * | 6/1993 | Crain | G06K 9/00 |
| | | | | 348/128 |
| 5,224,176 A | | 6/1993 | Crain | |

(Continued)

OTHER PUBLICATIONS

Bassett, Rick, et al., "Development of an Automated Coin Grader: A Progress Report", Proceedings of MASPLAS'02, The Mid-Atlantic Student Workshop on Programming Languages and Systems, Pace University, Apr. 19, 2002. pp. 15.1-15.10.

*Primary Examiner* — Joon Kwon
(74) *Attorney, Agent, or Firm* — Wendy W. Koba

(57) ABSTRACT

A 3D imaging and image processing system is configured to collect and analyze data defining a predetermined set of physical and visual attributes of a collectible object. The collected 3D image information is stored in a database, which also contains a record of 3D image information associated with a defined gold-standard object of the same kind. The analysis is used to generate as an output an "objective valuation" of the collectible object based upon a comparison to the stored gold-standard image data. When used with collectible coins, the objective valuation is used in the assignment of a specific "grade", using a well-known industry grading standard.

15 Claims, 6 Drawing Sheets

(51) Int. Cl.
    *G06F 16/51*      (2019.01)
    *G06F 16/583*     (2019.01)

(56) References Cited

U.S. PATENT DOCUMENTS

| | | | |
|---|---|---|---|
| 5,494,147 A | 2/1996 | Takahashi et al. | |
| 7,155,056 B2 | 12/2006 | Andersen | |
| 7,480,407 B2 | 1/2009 | Imamura et al. | |
| 2002/0141633 A1* | 10/2002 | Nakashima | G06T 7/0002 |
| | | | 382/144 |
| 2003/0053676 A1* | 3/2003 | Shimoda | G01N 21/95684 |
| | | | 382/145 |
| 2006/0032726 A1* | 2/2006 | Vook | G07D 5/005 |
| | | | 194/328 |
| 2009/0231570 A1* | 9/2009 | Toda | G01B 11/25 |
| | | | 356/3.03 |
| 2010/0231690 A1* | 9/2010 | Fujieda | G06K 9/00214 |
| | | | 348/47 |
| 2013/0188038 A1* | 7/2013 | Tanimoto | A61J 3/06 |
| | | | 348/86 |
| 2013/0300729 A1* | 11/2013 | Grimaud | G06Q 10/087 |
| | | | 345/419 |
| 2015/0054918 A1* | 2/2015 | Lee | G01B 11/2522 |
| | | | 348/46 |
| 2016/0044300 A1* | 2/2016 | Imai | H04N 1/00278 |
| | | | 348/46 |

\* cited by examiner

DEPTH MAP ACROSS D (a) GOLD-STANDARD COIN (GS-C)

(b) TARGET COIN (c)

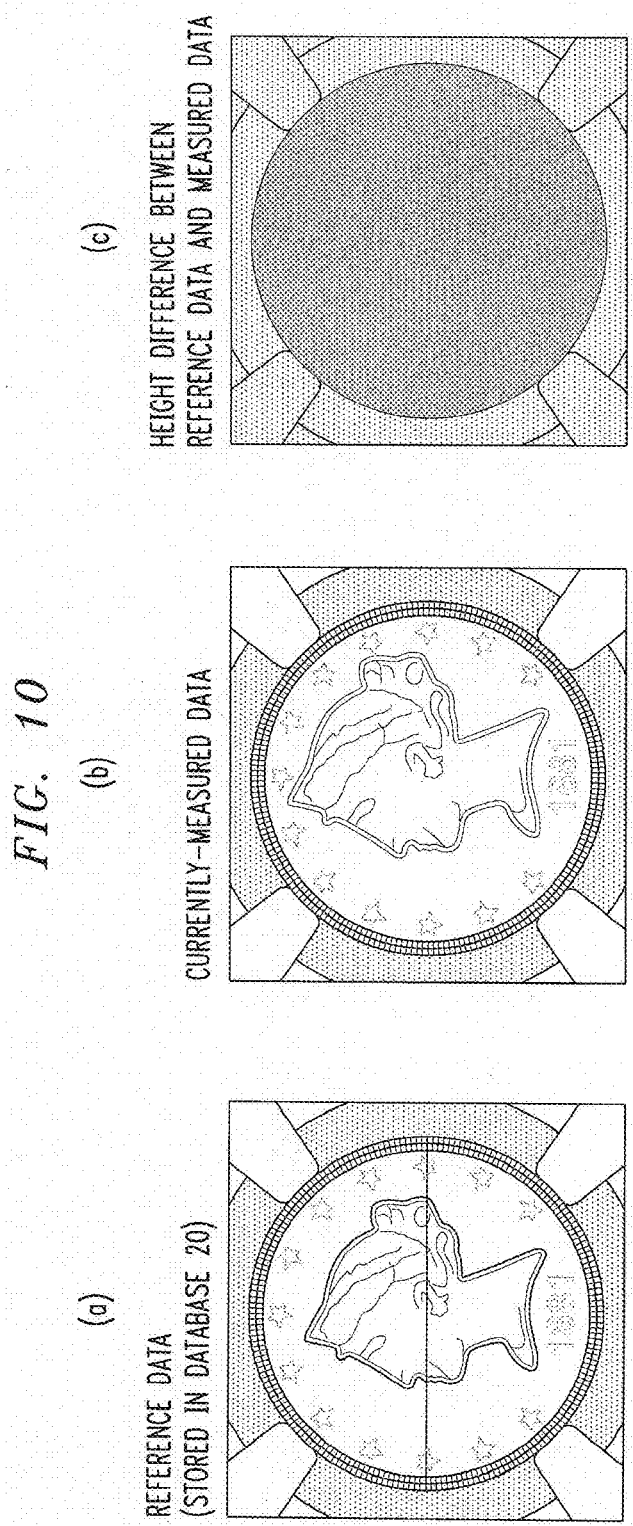

COMPUTER-CONTROLLED 3D ANALYSIS OF COLLECTIBLE OBJECTS

CROSS-REFERENCE TO RELATED APPLICATIONS

This application claims the benefit of U.S. Provisional Application No. 62/573,877, filed Oct. 18, 2017 and herein incorporated by reference.

TECHNICAL FIELD

The present invention relates to three-dimensional (3D) imaging of collectible objects and, more particularly, to a system of analyzing data collected during 3D imaging to provide objective valuation of a collectible object based on defined physical parameters.

BACKGROUND OF THE INVENTION

It is estimated that there are over five thousand coin companies in the United States involved in the buying and selling of collectible/rare coins, with a multi-billion annual revenue. The slabbed coin market alone is estimated to generate at least tens of million annually in revenue. The key constituents in the coin market are the grader, dealer, and consumer. Each has different needs within the sphere of evaluating a given coin to determine its proper grade (which is based on an industry-specific grading metric and assigned by the grader). While the grade for a given coin is provided by an expert grader that has been extensively trained, there are still subjective factors involved in the grading process that may lead to inconsistent grading, based on the particular individual or company performing the grading.

Other factors impacting the current coin grading system include, but are not limited to, "grade inflation", re-grading for increased value, bias of a specific grader, and like. Ideally, an objective and impartial system would be preferred for assigning a proper grade to a coin, particularly in the case of slabbed rare coins. The ability to objectively assess other types of collectible objects based on specific physical parameters so as to create a reliable and repeatable valuation is also an important goal.

SUMMARY OF THE INVENTION

Various ones of the problems remaining in the prior art are addressed by the present invention, which relates to three-dimensional (3D) imaging of collectible objects and, more particularly, to a system of analyzing data collected during 3D imaging to provide objective valuation of a collectible object based on defined physical parameters.

In accordance with one or more embodiments of the present invention, a 3D imaging and image processing system is disclosed that collects and analyzes data defining a predetermined set of physical and visual attributes of a collectible object. The analysis is used to generate as an output an "objective valuation" of the collectible object. When used with collectible coins, the objective valuation is a specific "grade", assigned using a well-known industry standard.

In general terms, the 3D imaging and analysis system of the present invention is applicable to performing objective evaluation (e.g., "grading") of any relatively flat object, based on physical and visual parameters associated with front and back surfaces. Besides coins, other types of tokens, paper currency, comic books, posters, and the like may be evaluated using the system of the present invention to collect and assess data related to the 3D topology of front and rear surfaces (e.g., looking for folds, tears, mars, and the like) and data related to variations in visual aspects (e.g., coloring, tint and the like).

In one exemplary embodiment, the present invention takes the form of a system for performing three-dimensional (3D) image analysis of a coin, with the system comprising a 3D imaging system (including a light source and a camera system), a translation table positioned in relation to the light source and the camera system (the translation table including a mounting surface for supporting the coin to be imaged) and a computer system. The computer system is particularly configured to perform 3D image analysis and includes a database storing collected 3D image data (physical and visual data) for a plurality of coins, a table controller module (coupled to the translation table) for controlling the positioning and movement of the translation table with respect to the 3D imaging system, and a processor coupled to the translation table for providing commands controlling a movement of the translation table, the processor also utilized for evaluating collected 3D image data and providing as an output objective information regarding physical and visual attributes of the coin.

Besides objective valuation of collectible objects, it is contemplated that the 3D imaging and analysis system of the present invention may be used to authenticate (i.e., verify) that a specific object is not a fake, but is the bona fide object itself. Using the system of the present invention to scan and store image data of a specific object, a collection of image data generated at a later point in time for the "same" object can then be compared to the stored data to verify its authenticity.

Another embodiment of the present invention takes the form of a method of creating objective information utilized in grading a target coin. The method comprises the steps of: storing three-dimensional (3D) image data of a reference coin in a database as a reference file record; providing a 3D imaging system; mounting the target coin on a translation table aligned with the 3D imaging system; controlling movement of the translation table with respect to the 3D imaging system to perform 3D surface topology measurements and visual (coloring) measurements across a surface of the target coin; storing the topology and visual measurements in the database as a measured target coin file; and comparing the stored measurements against the reference file record measurements and generating as an objective information output a difference in measurements at a predetermined number of locations.

Other and further objects and advantages of the present invention will become apparent during the course of the following discussion and by reference to the accompanying drawings.

BRIEF DESCRIPTION OF THE DRAWINGS

Referring now to the drawings, where like numerals represent like parts in several views:

FIG. 4(c) is a "heat map" showing differences in height as a function of color when comparing the physical topology of the target coin (i.e., measurements above or below a reference plane) to that of the GS-C;

FIG. 6(c) is a heat map illustrating differences feature height/depth between the two coins;

FIG. 10 illustrates an exemplary verification process as provided in accordance with the present invention to ascertain if a specific coin being offered for identification matches previously-recorded 3D image data stored in a database, where FIG. 10(a) is a digital image of the stored data for a particular coin, FIG. 10(b) is a real-time digital image of a coin that is purported to be that associated with the stored data, and FIG. 10(c) is an optical comparison of the height difference between the images of FIGS. 10(a) and (b).

DETAILED DESCRIPTION

As will be described in detail below, the present invention relates to computer-controlled 3D analysis of collectible objects and, in particular, to utilizing the advantages of 3D imaging and image processing to collect and analyze data defining the physical and visual attributes of a collectible object in a manner that generates an objective valuation as an output. Aspects of the present invention will be described with respect to collectible/rare coins, where the "objective valuation" is utilized in determining the grade assigned to a coin based on numismatic standards. It is to be understood that similar industry standards of grading are codified for various other collectible objects and aspects of the inventive 3D imaging and image processing methodology may likewise be used to provide objective valuation of these objects.

In accordance with the principles of the present invention, 3D image data from a coin being evaluated is compared against pre-defined "reference" data (i.e., similar 3D image data) associated with a known gold-standard coin. The degree of correlation between the two sets of data provides an objective factor in determining the condition of the coin being evaluated and is useful by a professional grader in assigning a grade to the coin, as described in detail below. In some cases, a full scan of a coin (both front and reverse sides) is performed and then compared to the previously-stored full-scan image data associated with the gold-standard coin. The full scan is particularly useful in situations implementing an automated "machine grading" of a given collectible coin. In other cases, the system of the present invention may be used to generate 3D image data of selected portions/sectors of a given coin, and thus avoids the need to perform a complete scan of both sides of the collectible coin. The latter scenario is particularly relevant when the system of the present invention is utilized as a tool by a professional grader to derive additional objective data as supplemental information is determining a proper grade for a given coin.

Figure 1:
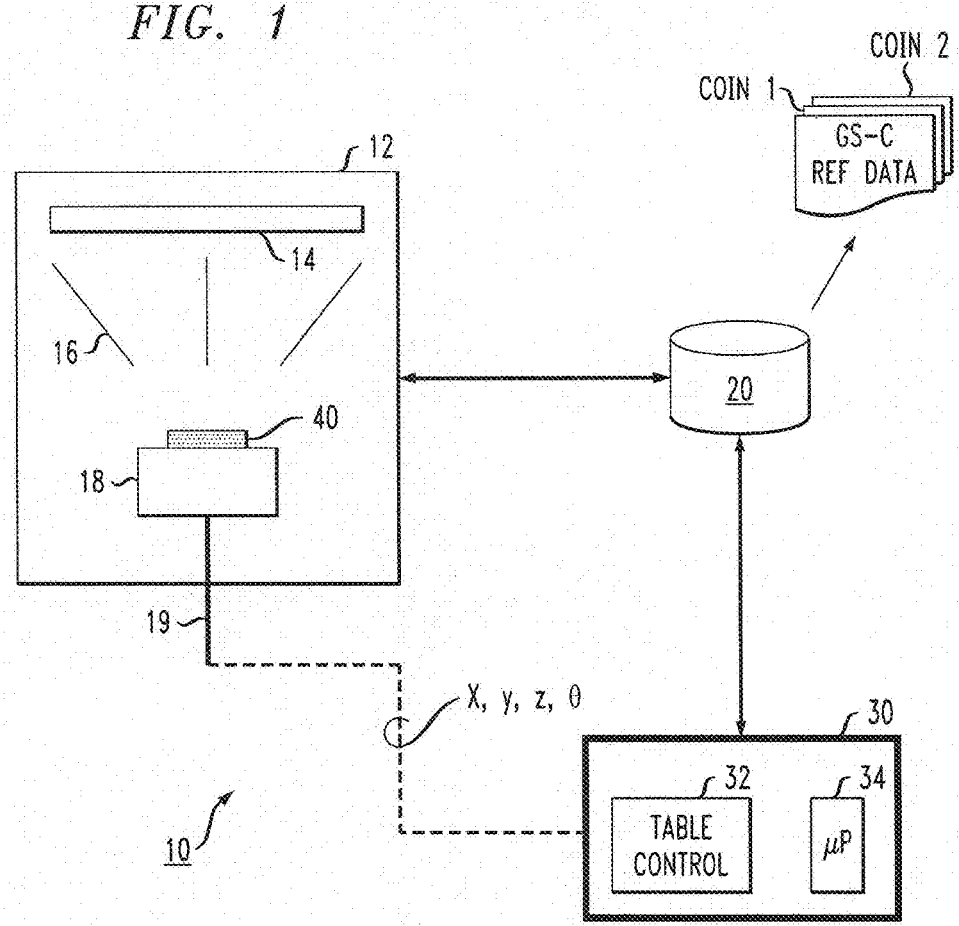
FIG. 1 is a simplified block diagram of a system that may be configured to work with 3D digital information of collectible objects in accordance with the present invention.

FIG. 1 is a simplified block diagram of a system 10 that may be used in accordance with the present invention to collect, store, and use 3D digital image information in the valuation and verification of collectible objects. As shown, system 10 includes a 3D imaging device 12 for collecting data from a collectible object under study (for example, a coin). Various types of specific imaging devices may be used for the purposes of the present invention. In general, such an imaging device includes a lighting system 14, a multi-camera scanning system 16, and a mounting platform 18.

Lighting system 14 may take the form of a "structured white light" source that illuminates an object with a specific pattern of light (e.g., grids, horizontal lights, etc.) to generate 3D differentiation across the surface topology of the object. A scanning laser beam may also be used to create the required illumination. Multi-camera system 16 typically comprises at least three separate cameras disposed in a specific arrangement to collect sufficient spatial information for the creation of 3D digital images. Platform 18 is used to support the object to be imaged in a proper position and orientation with respect to structured light system 14 and multi-camera scanning system 16.

As also shown in FIG. 1, system 10 further includes a database 20 that is used to store the information collected by 3D imaging device 12, and a computer system 30 used to control the operation of imaging device 12 and provide analysis of the data stored in database 20 in the manner required for a specific purpose, as will be explained below. In a general sense, database 20 can be thought of as a part of computer system 30. In the configuration of FIG. 1, database 20 is illustrated as a separate component to emphasize the point that database 20 may be remotely located with respect to 3D imaging device 12, as long as a communication link can be established between local computer system 30 and remote database 20. Platform 18 preferably takes the form of an XY table, equipped with microcontrollers 19 for separately adjusting x, y, z and θ positions (of the Cartesian axes system) of platform 18 with respect to multi-camera scanning system 16. In this exemplary embodiment, microcontrollers 19 may be controlled by a table control module 32 element within computer system 30 to create micron-scale movements along one or more of these axes and ensure proper alignment and orientation of the coin being imaged with a given camera system, as well as control the scanning progression along a specific area of a coin.

Figure 2:
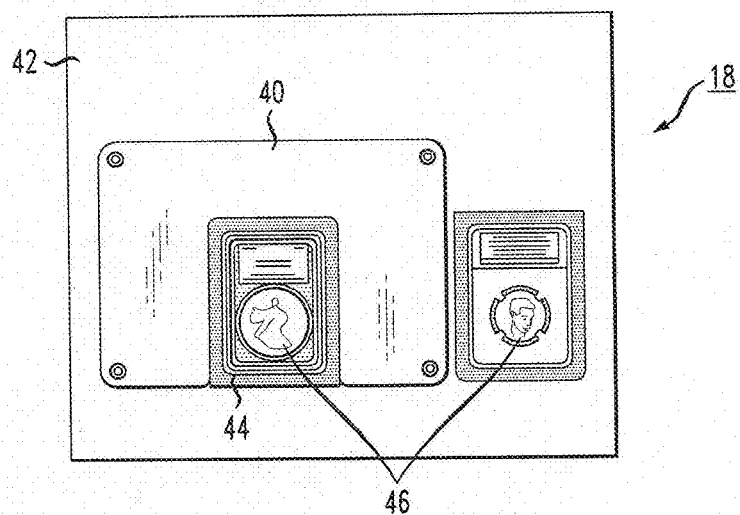
FIG. 2 is a top view of a mounting platform for supporting a coin in a preferred orientation within a 3D imaging system.

FIG. 2 illustrates details of an exemplary platform 18 configured in this example to mount a coin in a specific, predefined orientation. It is important, particularly when grading a coin compared to a gold-standard coin, that the coin being imaged is disposed in precisely the same location and orientation as the gold-standard coin was when the initial reference image data was collected. Platform 18 is designed to provide this desired alignment. FIG. 2 also illustrates a fixture 40 that is attached to a top surface 42 of platform 18. In this particular embodiment, fixture 40 is formed to include a cut-out feature 44 for accepting an associated holder 46. Cut-out feature 44 is particularly configured to provide the necessary registration between holder 46 (and, therefore, the collectible object being imaged) and the position of lighting system 14 and camera system 16. By using cut-out feature 44 to provide registration of the imaging surface with the 3D system, multiple objects may be positioned and imaged on the same platform 18 with repeatable results in terms of location and orientation.

In this particular embodiment of the present invention, holder 46 comprises a case designed for housing the coin to be imaged. Holder 46 is formed of a selected material having a transparent outer surface selected to not interfere with scanning process. That is, the top (and bottom) surface of holder 46 is formed of a material that will not create reflections, or otherwise introduce any changes to the color, tint, or luster of the coin, while remaining scratch-proof. Since the sizes and orientations of fixture 40, cut-out feature 44 and holder 46 are well-controlled, the proper positioning of the coin with respect to the imaging system is ensured. It is to be understood that different types of holders may be used for different types of coins or other collectible objects, and may involve the use of a different fixturing arrangement, as discussed below.

In some cases, a target coin being offered for evaluation is encased in its own holder (i.e., a "slabbed" coin). For this scenario, cut-out feature 44 is sized (or adjusted in size) to accept a conventional slabbed coin. In other cases, a "raw" coin (i.e., an un-slabbed coin) is presented for evaluation. A set of holders suitable for temporarily mounting raw coins of different denominations are provided with the inventive system. These temporary holders are configured to fit within cut-out feature 44 so that proper orientation and location between the coin and the imaging system is maintained.

Figure 3:
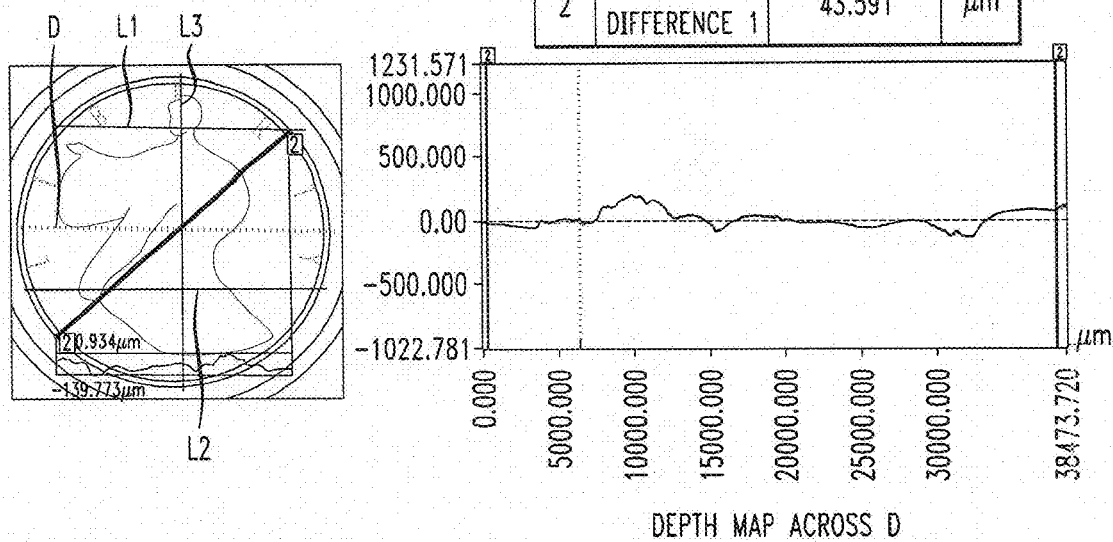
FIG. 3 illustrates exemplary data collected by a system such as that shown in FIG. 1.

FIG. 3 illustrates an example of one type of data collected and used in accordance with the present invention. An exemplary coin C is shown on the left-hand portion of FIG. 3, with the results of a scan across a defined diameter location D shown in the right-hand portion of FIG. 3. The scan, referred to hereinafter as a "depth map", measures the physical height of the features (both raised features and recessed features) along defined diameter location D, defined as the "topology" of the surface. These physical features include the intended strike marks, as well as any unique mars, scratches, and the like that may be at random locations across the surface of the coin. While the analysis of feature depth vs. the depth of a known gold-standard coin is important for the purposes of machine grading, the discovery of any mars, nicks or scratches in the system of the present invention is additional information used by an expert grader in determining the final grade of a particular coin. In one or more exemplary embodiments of the present invention, it is possible to achieve magnifications in the range of about 40× to 80× for the coins being imaged (both reference and target coins). Advantageously, the 3D imaging system as used in the present invention is able to perform depth measurements (with respect to analyzing raised or recessed features) with a sub-micron repeatability and an accuracy in the range of ±3 μm.

In accordance with the principles of present invention, scans may be performed across several other line segments of the same coin (shown as L1, L2, and L3 in FIG. 3), with the set of depth maps for these line segments thereafter stored in database 20 in association with a database record identified by a specific ID number assigned to coin C. It is to be understood that the complete surface of the coin may be scanned and the digital image data stored in database 20. However, the size of the files associated with such a full-coin scan (as well as the time required for performing this type of scan) may not be warranted for many different purposes of the present invention (such as when using the system as a supplemental tool to assist in the grading process, as mentioned above). For example, a complete scan of a large-sized coin (such as an American Eagle) may take as long as three and a half minutes to complete.

Figure 4:
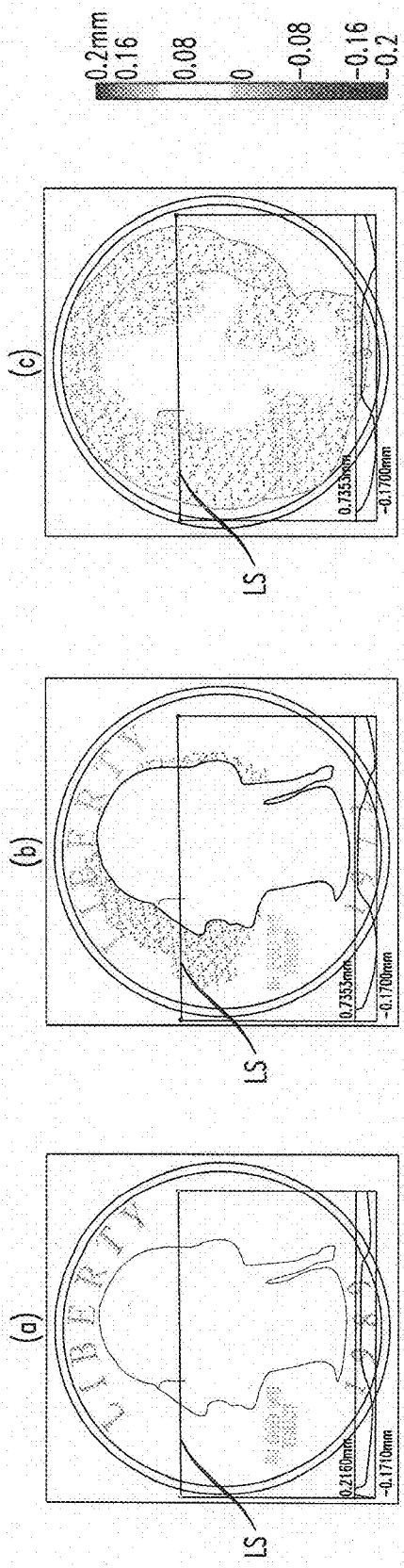
FIG. 4 illustrates an exemplary use of computer-controlled 3D analytics to assist in a coin grading process, using 3D images of a gold-standard coin (GS-C) and a target coin, where in particular FIG. 4(a) contains a digital image of a GS-C, FIG. 4(b) contains a digital image of a target coin being analyzed.

FIG. 4 illustrates an exemplary use of the computer-controlled 3D analytics of the present invention to assist in the coin grading process. In performing any type of computer-based coin grading procedure, it is necessary to have an agreed-upon gold-standard coin of the type being evaluated (i.e., agreed-upon in the industry as exemplary of the highest possible grade). FIG. 4(*a*) is a digital image of this reference, referred to as GS-C (as in "gold-standard coin"). A scan is made of this GS-C coin using the same 3D imaging device 12 as used for follow-up scanning of other coins. The data associated with the GS-C (both physical/topology measurements and visual/coloring measurements) is stored in database 20, and identified as being the reference data used for grading subsequent coins of the same type. In some cases, a compilation of data associated with a number of coins having the highest grade is used to create the GS-C data, where the compiled data is used in the same manner as the data collected from a single coin.

At some time thereafter, a second coin of the same denomination (a "target coin", shown in FIG. 4(*b*)) is placed on mount 18 of device 12 and scanned in the same manner as the GS-C coin. Its data is collected and also stored in database 20. Computer 30 may be instructed to perform various "compare" processes of the target coin against the GS-C coin. FIG. 4(*c*) illustrates the results of an "optical comparison" of the differences in image between the GS-C and target coins, referred to at times as a "heat map". The optical comparison depicts the differences in feature height across the complete face of the coin. An associated color palette provides a reference key in terms of height difference (perhaps in the mm range) between the GS-C coin and the target coin. A professional grader reviewing the optical comparison in FIG. 4(*c*) will immediately notice the differences in height at various locations associated with the darker shades of color.

Figure 5:
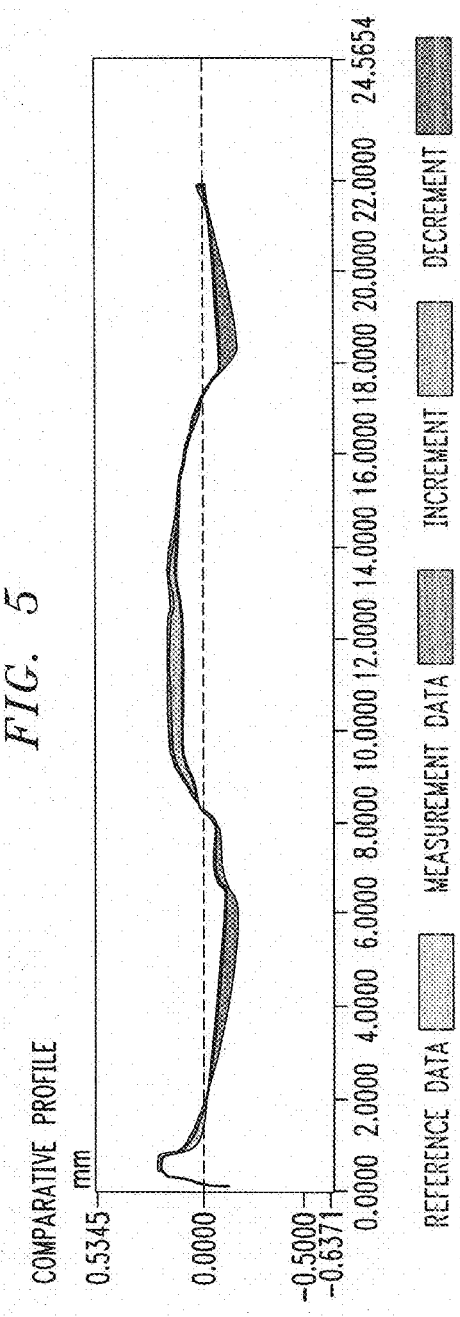
FIG. 5 is a comparative depth map, illustrating the differences in height between the GS-C and target coin shown in FIG. 4.

Advantageously, a professional grader may then request and review additional image data associated with a selected portion of the target coin with respect to the GS-C. For example, a request may be made (via computer system 30) to show a depth map comprise across a defined line segment of the coins. Referring to FIGS. 4(*a*) and 4(*b*), this line segment is shown as "LS". Computer system 30 then interacts with database 20 to retrieve the specific depth map data for both, creating the comparative profile as shown in FIG. 5. This additional, detailed information may then assist a professional grader in quantifying specific information regarding the differences between the GS-C and the target coin at selected locations.

Figure 6:
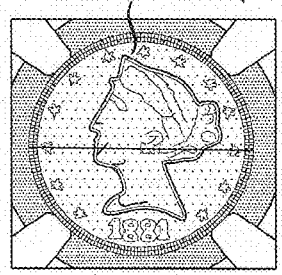
FIG. 6 illustrates another set of 3D image data as collected for a gold-standard coin of a different denomination and a target coin, where as with FIG. 4, FIG. 6(a) contains a digital image of a GS-C, FIG. 6(b) contains a digital image of a target coin.
Figure 6:
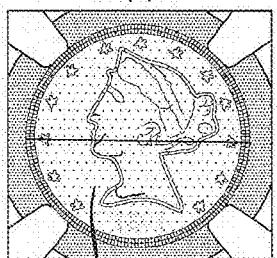
Figure 6:
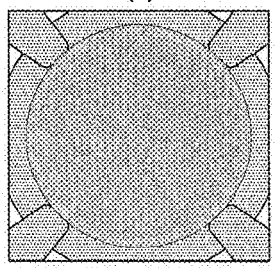

FIG. 6 illustrates the use of 3D image data for a different collectible coin. As with the example shown in FIG. 4, the image created in FIG. 6(*a*) is the 3D image data collected from a gold-standard coin. The target coin image is shown in FIG. 6(*b*), and the comparison "heat map" is shown in FIG. 6(*c*).

Figure 7:
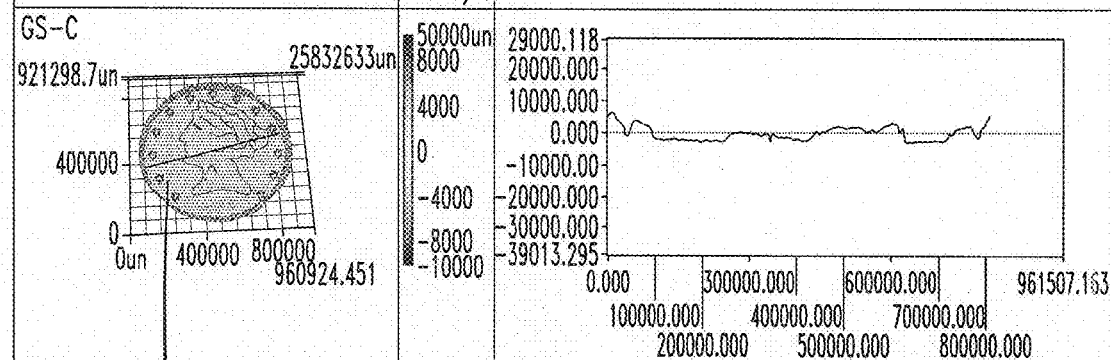
FIG. 7 shows an alternative depiction of the same data as used in the illustration of FIG. 6.
Figure 7:
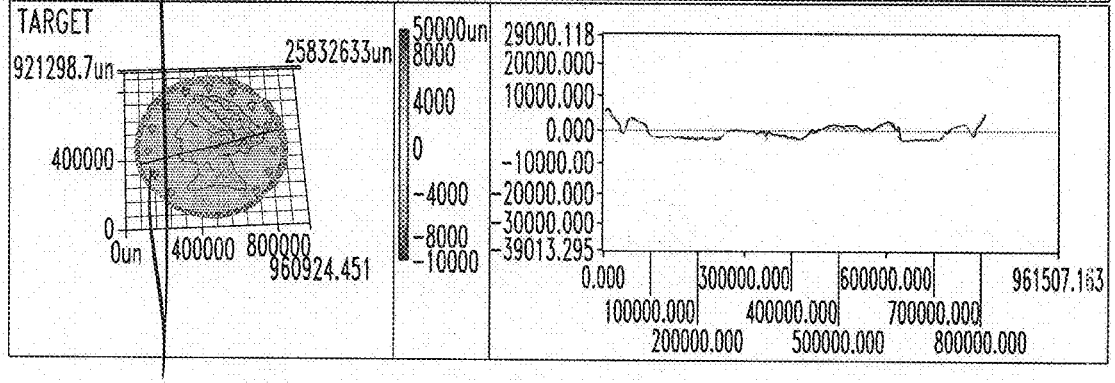

FIG. 7 shows a different depiction of comparison data for the same two coins as described above in association with FIG. 6. In this case, computer 30 has been instructed to retrieve the depth map associated with a defined diameter DD along both the GS-C coin and the target coin. As mentioned above, all of this data has been previously collected by a scanning device 12 and stored in database 20, so as to be available for use by registered users. An analysis module 34 within computer 30 can be used to identify selected points along diameter DD where the target coin differs from the GS-C by a defined amount, where this difference will affect the grade ascribed to the target coin by a professional grader. This depth map comparison process may be repeated along any number of other line segments, since database 20 contains a complete record of all data associated with the GS-C coin, and can instruct device 12 to perform a scan along the target coin at any desired line segment, as a function of the defined X-Y location.

It is also contemplated that the inventive system can be used to designate specific areas of a coin which are particular to that type of coin unique (e.g., a selected region across the forehead of a profile on a coin), where it is desired to always perform a scan across these regions and create a depth map for these unique areas. Inasmuch as professional graders would be attuned to look for slight variations in these "unique" areas, having the objective data provided by the inventive system allows the grader to improve the confidence and consistency in the grades assigned to this type of coin.

In particular, mount 18 can be configured to be computer-controlled in a manner where it returns to the designated unique area(s) on subsequent target coins to collect specific depth map data for these areas. The X-Y attitude of platform 18 may be programed to return to the areas of interest on another imaging device instrument in a different geographic location. In a preferred embodiment of the present invention, the X-Y attitude information of the area of interest on the coin may be carried on the coin's RFID tag, so that when the tag is scanned at a later time on a different scanning device, the microcontroller will execute the defined stage movement and correctly analyze the area(s) of interest for that coin.

Figure 8:
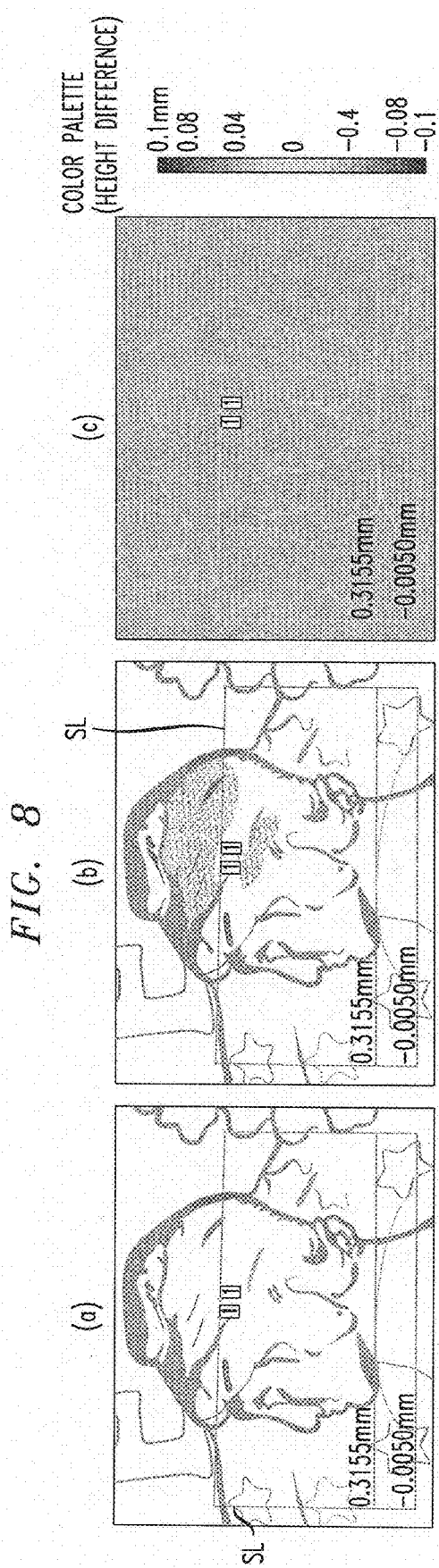
FIG. 8 contains 3D image data as collected for a specific sector of a GS-C and the same sector of a target coin, illustrating capabilities of inventive system in analyzing selected areas of a collectible object, with FIG. 8(a) associated with the GS-C, FIG. 8(b) with the target coin, and FIG. 8(c) being the associated heat map based on a comparison of the image in FIG. 8(a) to the image in FIG. 8(b)
Figure 9:
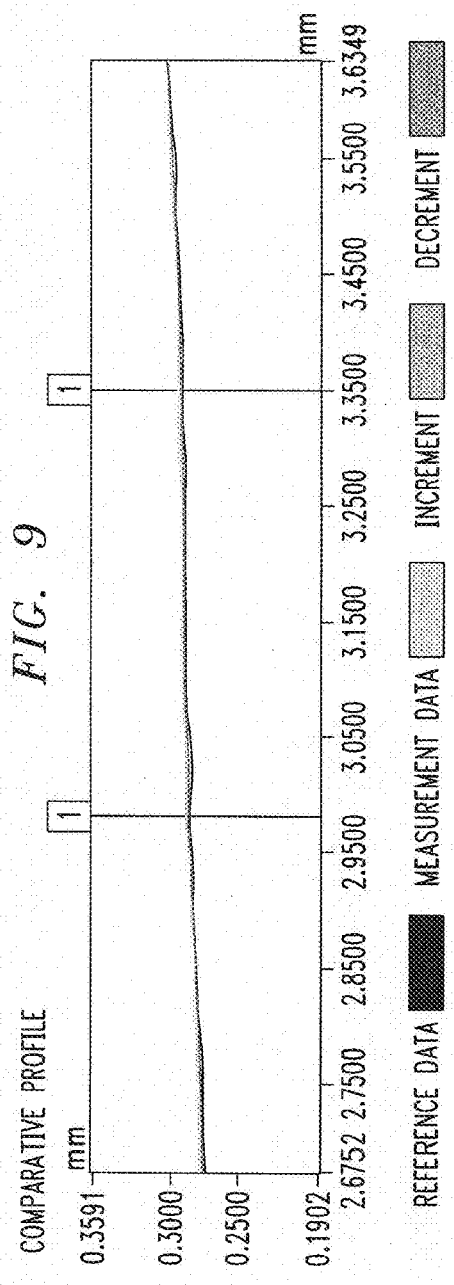
FIG. 9 is a comparative profile depth map taken along lines SL-SL in FIGS. 8(a) and (b)

FIG. 8 illustrates this aspect of the present invention, where FIG. 8(a) depicts 3D image data associated with a specific sector S of a given GS-C. The 3D image data shown in FIG. 8(b) is thereafter collected from a target coin that is properly positioned (as controlled by platform 18) to have the same sector S be illuminated and measured. The resultant heat map based upon a comparison of these sectors is shown in FIG. 8(c). FIG. 9 illustrates a comparative profile depth map, compiled from the measurements take along sector line SL-SL of the images in FIGS. 8(a) and (b).

It is to be understood that analysis module 34 of computer system 30 can also be configured to perform a rules-based grading of a particular coin based on any of this comparison data, where variations in topology/physical parameters such depth, surface mar, scratches, etc. and coloring/visual parameters such as toning, luster, and tint may be correlated with different grades. Therefore, a professional grader may use the system of the present invention to create an objective set of data (or, alternatively an actual "machine grade") to be used in combination with the subjective aspects (i.e., "eye appeal") of a given coin as discerned by the grader to arrive at the proper grade for that specific coin. The ability to create and use an objective set of data is considered to substantially reduce the possibilities of both "grade inflation", grade inconsistency, bias, and the like.

As described above, another feature of the system of the present invention is the ability to quantify visual parameters of a collectible object under review. When used in the analysis of a collectible coin, the visual parameters may include, but not be limited to, color, tint and luster. In particular, the inventive system can use either structured white light or laser scans to perform visual measurements and quantify a coin's value based on an RBG pixel-by-pixel comparison of the GS-C pixels to the similarly-located (X-Y) target coin pixels. As an alternative to the pixel-by-pixel approach, a predefined area of pixels on both the target and reference coins may be subjected to structured white light or laser scans. Through a collaborative effort between the system and the grader, the subjective determination of the grader's "eye appeal" evaluation can be combined with this objective visual information to provide the final grade for a particular coin.

Advantageously, the system of the present invention preferably utilizes a remotely-accessible database (i.e., a web-accessible database) so that registered users, such as coin graders, pre-authenticated coin dealers, and the like, can utilize the stored information from any location, at any time the information is needed.

As mentioned above, another aspect of the system of the present invention is the ability to use collected 3D image data to verify that a coin being presented as a specific, unique "collectible object" is indeed the coin it is purported to be.

For example, in cases where one is attempting to authenticate a specific coin in a transaction between a buyer and seller, the system of the present invention may be used to scan the coin in question, and compare the results to stored data for that specific coin ID in database 20. Our associated U.S. Pat. No. 9,575,724 issued Feb. 21, 2017, entitled "Verification System and Method for a Collectible Object" (herein incorporated by reference) describes an exemplary system for comparing stored data against currently-collected data to determine if a coin in question is indeed the same as the coin associated with the stored data. For this purpose, the individual performing the verification needs to have access to an "approved" imaging device (i.e., a device calibrated to match the parameters of the device used in collecting the initial "fingerprint" data). Said another way, if the digital image data of the coin in question does not match the digital image data stored in database 20, the coin in question can be flagged as a fake by the individual performing the verification.

FIG. 10 illustrates this verification process, where FIG. 10(a) is a digital image of the stored data for a particular coin. FIG. 10(b) is a real-time digital image of a coin that is purported to be that associated with the stored data. FIG. 10(c) is an optical comparison of the height difference between FIG. 10(a) and FIG. 10(b), where in this case the uniform color across the surface of the image supports the conclusion that the just-scanned coin is indeed the same coin used to create the stored data (i.e., a "verification" that the presented coin is the true coin).

It will be apparent to those skilled in the art that various modifications and variations can be made to the present invention without departing from the spirit or scope thereof. Thus, it is intended that the present invention cover these modifications and variations of the above-described embodiments, all of which are considered to fall within the spirit and scope of the invention as defined by the claims appended thereto.

What is claimed is:

1. A system for performing three-dimensional (3D) image analysis of a collectible coin, the system comprising:
   a 3D imaging system including a light source and a multi-camera scanning system for scanning a presented surface of a target collectible coin to capture measurements of either one or both of physical and visual attributes of the target collectible coin, creating a plurality of 3D image data as an output;
   a translation table positioned in relation to the light source and the multi-camera scanning system, the translation table including a mounting surface for supporting the target collectible coin to be scanned; and a computer system for performing 3D image analysis, the computer system including
a database for storing 3D image data associated with a reference collectible coin of an industry-specific grade based on numismatic standards;
a table controller module, coupled to the translation table, for controlling the positioning and movement of the translation table with respect to the 3D imaging system to enable scanning across the presented surface of the target collectible coin; and
a processor coupled to the translation table for providing commands controlling a movement of the translation table, the processor also utilized for comparing the 3D image data captured by the 3D imaging system for the target collectible coin to the 3D image data of the reference collectible coin and providing as an output an assigned automated grade for the target collectible coin based on a degree of correlation between the stored 3D image reference data and captured 3D image data of the target collective coin.

2. The system as defined in claim 1 wherein the processor commands the 3D imaging system to perform a full scan of an exposed surface of the target collectible coin.

3. The system as defined in claim 1 wherein the processor commands the 3D imaging system to scan across one or more line segments of the target collectible coin, measuring heights of raised features and depths of recessed features across the defined line segments.

4. The system as defined in claim 1 wherein the translation table further comprises a plurality of microcontrollers, a separate microcontroller for activating movement of the translation table along the x-, y-, z-, and θ-axes of a standard Cartesian axis system.

5. The system as defined in claim 4 wherein the plurality of microcontrollers is responsive to command signals from the table controller module of the computer system.

6. The system as defined in claim 1 wherein the mounting surface of the translation table comprises at least one registration feature for defining a position of a target collectible coin with respect to the 3D imaging system.

7. The system as defined in claim 6 wherein the target collectible coin being analyzed is contained within a transparent slab and the at least one registration feature comprises a recessed location sized to accommodate the transparent slab in a predetermined orientation and position with respect to the 3D imaging system.

8. The system as defined in claim 1 wherein the database is remotely located with respect to the 3D imaging system.

9. The system as defined in claim 1 wherein the light source comprises a structured white light source.

10. The system as defined in claim 9 wherein the processor commands the 3D imaging system to perform an RGB pixel-by-pixel measurement of visual attributes of the coin.

11. The system as defined in claim 1 wherein the light source comprises a scanning laser source.

12. The system as defined in claim 1 wherein the multi-camera scanning system comprises at least a set of three separate cameras disposed at defined locations with respect to the translation table.

13. A method of creating objective information utilized in grading a target collectible coin, the method comprising the steps of:

storing three-dimensional (3D) image data of a reference gold-standard collectible coin in a database as a reference gold-standard file;
providing a 3D imaging system;
mounting the target collectible coin on a translation table aligned with the 3D imaging system;
controlling movement of the translation table with respect to the 3D imaging system to perform scanning of the target collectible coin to capture 3D surface topology measurements and RGB pixel measurements across a surface of the target collectible coin;
storing the topology and RGB pixel measurements in the database as a measured target collectible coin file; and
comparing the measured target collectible coin file to the reference gold-standard file and generating as an objective information output an assigned machine grade of the target collectible coin based upon a degree of correlation between the stored 3D image reference data and the captured 3D image data of the target collectible coin.

14. The method as defined in claim 13 wherein the 3D image data of the reference gold-standard coin is created by the provided 3D imaging system.

15. A system for performing three-dimensional (3D) image analysis of a target collectible coin, the system comprising:
a 3D imaging system including a light source and a multi-camera scanning system for scanning a presented surface of a target collectible coin to capture measurements of the physical height of features along a predetermined scan line across a target collectible coin, features including expected raised features and expected recessed features as well as unexpected random imperfections, creating 3D image topology data as an output;
a translation table positioned in relation to the light source and the multi-camera scanning system, the translation table including a mounting surface for supporting the target collectible coin; and
a computer system for performing 3D image analysis, the computer system including
a database for storing collected 3D image topology data captured by the 3D imaging system and 3D image topology data associated with a reference collectible coin of an industry-specific grade based on numismatic standards;
a table controller module, coupled to the translation table, for controlling the positioning and movement of the translation table with respect to the 3D imaging system; and
a processor coupled to the translation table for providing commands controlling a movement of the translation table, the processor also utilized for comparing the 3D image topology data of the target coin to the stored 3D image topology data of the reference collectible coin, and providing as an output an assigned machine grade for the target collectible coin based on the degree of topological correlation between the reference collectible coin image topology data and the target collectible coin image topology data.

* * * * *